(12) United States Patent
Park et al.

(10) Patent No.: US 10,949,424 B2
(45) Date of Patent: Mar. 16, 2021

(54) OPTIMIZATION TECHNIQUE FOR DATABASE APPLICATION

(71) Applicant: TmaxData Co., Ltd., Gyeonggi-do (KR)

(72) Inventors: Sang Young Park, Gyeonggi-do (KR); Cheol Woo Kim, Gyeonggi-do (KR); Po Sung Chun, Gyeonggi-do (KR)

(73) Assignee: TMAXDATA CO., LTD.

( * ) Notice: Subject to any disclaimer, the term of this patent is extended or adjusted under 35 U.S.C. 154(b) by 548 days.

(21) Appl. No.: 15/654,041

(22) Filed: Jul. 19, 2017

(65) Prior Publication Data
US 2018/0357279 A1 Dec. 13, 2018

(30) Foreign Application Priority Data
Jun. 12, 2017 (KR) .................. 10-2017-0073281

(51) Int. Cl.
| | | |
|---|---|---|
| *G06F 16/00* | (2019.01) | |
| *G06F 16/2453* | (2019.01) | |
| *G06F 8/41* | (2018.01) | |
| *G06F 8/10* | (2018.01) | |
| *G06F 16/33* | (2019.01) | |

(52) U.S. Cl.
CPC .......... *G06F 16/24542* (2019.01); *G06F 8/10* (2013.01); *G06F 8/425* (2013.01); *G06F 16/3335* (2019.01)

(58) Field of Classification Search
CPC ...... G06F 16/24542; G06F 8/425; G06F 8/10; G06F 16/3335
See application file for complete search history.

(56) References Cited

U.S. PATENT DOCUMENTS

| | | | |
|---|---|---|---|
| 5,091,852 A | 2/1992 | Tsuchida et al. | |
| 5,598,559 A | 1/1997 | Chaudhuri | |
| 6,351,742 B1 | 2/2002 | Agarwal et al. | |
| 7,092,931 B1 | 8/2006 | Kaluskar et al. | |
| 7,640,230 B2 | 12/2009 | Hanson et al. | |
| 7,912,835 B2* | 3/2011 | Rajamani | G06F 16/24524 707/718 |
| 8,204,876 B2* | 6/2012 | Bello | G06F 16/24539 707/717 |
| 8,335,767 B2* | 12/2012 | Das | G06F 16/24542 707/661 |
| 8,849,794 B2* | 9/2014 | Rajamani | G06F 16/24524 707/718 |
| 2016/0259825 A1* | 9/2016 | To | G06F 16/2455 |
| 2018/0114033 A1* | 4/2018 | Mathur | G06F 16/9535 |
| 2018/0218040 A1* | 8/2018 | Penmetsa | G06F 16/24547 |

* cited by examiner

*Primary Examiner* — Debbie M Le
(74) *Attorney, Agent, or Firm* — Fish IP Law, LLP

(57) ABSTRACT

Disclosed is a computer-readable medium including a computer program including encoded commands. The computer program is configured to cause one or more processors to perform operations for optimizing a database application when the computer program is executed by the one or more processors of a computer system and the operations include: operation for receiving a query including a bind parameter from an application source; operation for obtaining information related to the bind parameter included in the received query; and operation for rewriting the received query by reflecting the obtained information related to the bind parameter within the received query as hint information.

17 Claims, 5 Drawing Sheets

OPTIMIZATION TECHNIQUE FOR DATABASE APPLICATION

CROSS-REFERENCE TO RELATED APPLICATIONS

This application claims priority to and the benefit of Korean Patent Application No. 10-2017-0073281 filed in the Korean Intellectual Property Office on Jun. 12, 2017, the entire contents of which are incorporated herein by reference.

Technical Field

The present disclosure relates to the computer field, and more particularly, to optimization of a database application.

Background Art

Businesses of enterprises are rapidly expanding with explosive data growth and the emergence of diverse environments and platforms. As new business environments emerge, more efficient and flexible data services and information processing, and data management functions are needed. In response to these changes, research is continued on databases to solve problems of high performance, high availability, and scalability which are foundations of corporate business implementation.

In a database management system (DBMS), data may be stored in a data storage. In a relational database management system (RDMBS), the data storage may be referred to as a table. The table may include one or more rows and each of one or more rows may include one or more columns.

When the database includes a large amount of data, it may take a relatively long time to perform a query to retrieve data in which a user is interested. When it takes a long time for the database to respond to the query, it may adversely affect performance of the database.

A plurality of execution algorithms (alternatively, plans) may be considered in connection with a manner in which the query issued from client is processed. Since the respective execution algorithms have different properties, it is necessary to determine an algorithm most suitable for processing the corresponding query before processing the corresponding query.

U.S. Pat. No. 5,598,559 presents contents regarding optimization of the query for a relational database. In the aforementioned US patent, after a cost based optimizer statistically estimates the performance of the execution algorithms before executing a query operation, the execution is performed only with the resultant one algorithm, and as a result, there may be a situation in which a prediction is incorrect.

When the database application is created, bind parameters (alternatively, bind variables), which are types of transferring variable values to be used in the application, are frequently used. In addition, in order to utilize limited database resources in an OLTP environment used by an unspecified majority, the use of such bind parameters is essentially considered. In the related art, when the query including the bind parameter is input, the following techniques have been performed to achieve optimization in a SQL compiler.

As a first scheme, there is a bind peeking technique. In the bind peeking technique, the optimization is performed during runtime when the query is executed, after waiting until a time when the value of the bind variable is initially determined. Therefore, in the bind peeking technique, since the execution plan (i.e., the values of subsequent bind variables are not considered) is established based on the value actually bound when the query is initially executed, the value of the binding variable should be limited to the point of time when the query is initially executed. In the case of the bind peeking technique, since the optimization is performed with extremely few binding values without considering all binding values, the subsequent binding values are not considered. Therefore, the bind peeking technique has a disadvantage in accuracy for the optimization.

As a second technique, there is an adaptive cursor sharing technique. The adaptive cursor sharing technique is a scheme that recreates the execution plan according to a range of the value of the column compared with the bind parameter. In such a technique, after the execution plan is determined with the initial execution of the bind variable value under a runtime environment, a new bind variable value is used, and as a result, the execution plan needs to be created again (that is, different execution plans are created according to a distribution of the bind variable values). Therefore, there is a disadvantage that system overhead occurs. Moreover, the scheme also has an additional disadvantage in that the scheme may be applied only in a specific query such as comparison.

Accordingly, there is a need in the art for more efficiently creating an optimized execution plan for processing the query.

SUMMARY OF THE INVENTION

The present disclosure has been made in an effort to achieve efficient optimization of a database application in order to meet a demand in the art described above.

The present disclosure has also been made in an effort to shorten a query processing time in a DBMS.

The present disclosure has also been made in an effort to prevent performance degradation in optimizing the database application.

An exemplary embodiment of the present disclosure provides a computer-readable medium including a computer program including encoded commands. The computer program is configured to cause one or more processors to perform operations for optimizing a database application when the computer program is executed by the one or more processors of a computer system and the operations may include: operation for receiving a query including a bind parameter; operation for obtaining information related to the bind parameter included in the received query; and operation for rewriting the received query by reflecting the obtained information related to the bind parameter within the received query as hint information. In one example of the present disclosure, the operations may be performed by, for example, an application compiler of a database server. In another example of the present disclosure, the operations may be performed by the application compiler of a user terminal.

Another exemplary embodiment of the present disclosure provides a computer-readable medium including a computer program including encoded commands. The computer program is configured to cause one or more processors to perform operations for optimizing a database application when the computer program is executed by the one or more processors of a computer system and the operations may include: operation for receiving a rewritten query created based on information related to a bind parameter obtained in response to reception of a query including the bind parameter from a user terminal—the information related to the bind parameter being reflected to the rewritten query as hint information—; and operation for creating an optimized physical plan for the query from the application source based on the hint information reflected within the rewritten query. In one example of the present disclosure, the operations may be performed by, for example, an SQL compiler of a database server.

Still another exemplary embodiment of the present disclosure provides a database server for implementing an optimization operation for a database application. The database server may include: a communication module receiving a bind parameter from an application source; and a first compiling module obtaining information related to the bind parameter included in the received query and reflecting the obtained information related to the bind parameter within the received query as hint information to rewrite the received query.

Yet another exemplary embodiment of the present disclosure provides a user terminal for implementing an optimization operation for a database application. The user terminal may include: a first compiling module receiving a query including a bind parameter from an application source and obtaining information related to the bind parameter included in the query and reflecting the obtained information related to the bind parameter within the query as hint information to rewrite the query and transforming the rewritten query into a type enabled to be read by an SQL component in the database server to create an execution code; and a communication module transferring the created execution code to the database server. In additional exemplary embodiments of the present disclosure, at least some of components included in the user terminal may be incorporated into the database server.

According to an exemplary embodiment of the present disclosure, efficient optimization of a database application can be achieved.

According to an exemplary embodiment of the present disclosure, a query processing time in a DBMS can be shortened.

According to an exemplary embodiment of the present disclosure, performance degradation can be prevented in optimizing the database application.

BRIEF DESCRIPTION OF THE DRAWINGS

Various aspects are now described with reference to the drawings and like reference numerals are generally used to designate like elements. In the following embodiments, for a description purpose, multiple specific detailed matters are presented to provide general understanding of one or more aspects. However, it will be apparent that the aspect(s) can be executed without the specific detailed matters. In other examples, known structures and apparatuses are illustrated in a block diagram form in order to facilitate description of the one or more aspects.

DETAILED DESCRIPTION

Figure 1:
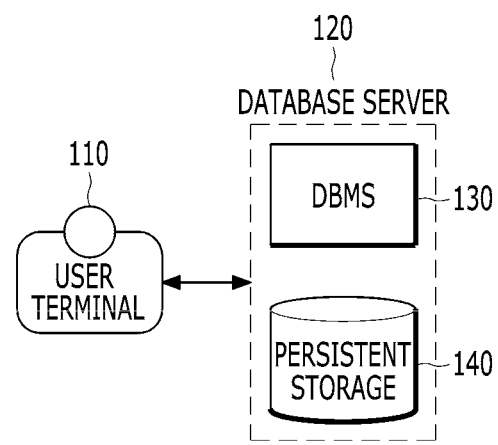
FIG. 1 is a schematic view of a system including a database server and a user terminal according to an exemplary embodiment of the present disclosure.

Various exemplary embodiments and/or aspects will be now disclosed with reference to drawings. In the following description, multiple detailed matters will be disclosed in order to help comprehensive appreciation of one or more aspects. However, those skilled in the art will recognize that the aspect(s) can be executed without the detailed matters. In the following disclosure and the accompanying drawings, specific exemplary aspects of one or more aspects will be described in detail. However, the aspects are exemplary and some among various methods in principles of various aspects may be used and the descriptions are intended to include all of the aspects and equivalents thereof.

Various aspects and features will be presented by a system which can include one or more apparatuses, terminals, servers, devices, components, and/or modules. It should also be appreciated and recognized that various systems can include additional apparatuses, terminals, servers, devices, components, and/or modules and/or that the various systems cannot include all of apparatuses, terminals, servers, devices, components, modules, and the like discussed in association with the drawings.

In "embodiment", "example", "aspect", "illustration", and the like used in the specification, it may not be construed that a predetermined aspect or design which is described is more excellent or advantageous than other aspects or designs. 'Component', 'module', 'system', 'interface', and the like which are terms used below generally mean computer-related entities and mean, for example, hardware, a combination of the hardware and software, or the software.

The term "or" is intended to mean not exclusive "or" but inclusive "or". That is, when not separately specified or not clear in terms of context, a sentence that "X uses A or B" is intended to mean one of natural inclusive substitutions. That is, "X uses A or B" may be applied to all of the case where X uses A, the case where X uses B, and the case where X uses both A and B. Further, it should be understood that the term "and/or" used in the specification designates and includes all available combinations of one or more items among enumerated related items.

The word "comprises" and/or "comprising" means that the corresponding feature and/or component is present, but it should be appreciated that presence or addition of one or more other features, components, and/or a group thereof is not excluded. Further, when not separately specified or not clear in terms of the context that a singular form is indicated, it should be construed that the singular form generally means "one or more" in the present specification and the claims.

The computer-readable medium in the present specification may include all kinds of storage media storing programs and data so as to be readable by the computer system. The computer readable media in the present disclosure may include both computer readable storage media and computer readable transmission media. According to an aspect of the present disclosure, the computer readable storage media may include a read only memory (ROM), a random access memory (RAM), a compact disk (CD)-ROM, a digital video disk (DVD)-ROM, a magnetic tape, a floppy disk, an optical data storage device, and the like. Further, the computer readable transmission media may include a predetermined medium of a type which is transmittable, which is implemented in a type of a carrier wave (e.g., transmissions through the Internet). Additionally, the computer readable media are distributed to systems connected through network to store computer readable codes and/or commands in a distribution scheme.

Prior to describing detailed contents for carrying out the present disclosure, it should be noted that configurations not directly associated with the technical gist of the present disclosure are omitted without departing from the technical gist of the present disclosure. Further, terms or words used in the present specification and claims should be interpreted as meanings and concepts which match the technical spirit of the present disclosure based on a principle in which the inventor can define appropriate concepts of the terms in order to describe his/her invention by a best method.

In the present disclosure, an application source as a source code of a program executed in a client or a database may be created through a programming language including a query by a developer or a user. The application source may be created by the programming language using, for example, PL/SQL, SQLJ, EmbededSQL, and/or client library.

In the present disclosure, the query means a predetermined request or command of requesting processing in a database server and may include, for example, data manipulation language (DML), data definition language (DDL), and/or PL/SQL. Further, the query in the present disclosure may mean a predetermined request issued from a user/developer. In addition, the query may mean a predetermined request input into a user terminal and/or the database server and processed in the user terminal and/or the database server.

FIG. 1 is a schematic view of an exemplary system including a user terminal 110 and a database server 120 according to an exemplary embodiment of the present disclosure.

As illustrated in FIG. 1, the system may include the user terminal 110 and the database server 120. The user terminal 110 and the database server 120 may be connected to each other by a predetermined network (not illustrated). A database management apparatus in the present specification may be used interchangeably with a database management apparatus.

As illustrated in FIG. 1, the user terminal 110 may mean a node(s) in a database system having a mechanism for communication through a network. For example, the user terminal 110 may include a predetermined electronic device having connectivity with a personal computer (PC), a laptop computer, a workstation, a terminal, and/or the network. Further, the user terminal 110 may include a predetermined server implemented by at least one of Agent, application programming interface (API), and Plug-in. In addition, the user terminal 110 may include an application source and/or a client application.

The user terminal 110 may be a predetermined entity which includes a processor and a memory to process and store predetermined data. Further, the user terminal 110 in FIG. 1 may be related with a user which uses the database server 120 or communicates with the database server 120. In such an example, the user terminal 110 may issue the query to the database server 120. In one example, the user terminal 110 may transfer a compiled and rewritten query to the database server 120. As one example, the user terminal 110 may receive the application source created by the programming language by the developer, etc. Further, for example, the user terminal 110 compiles the application source to create the client application. For example, the created client application may be transferred to the database server 120 and thereafter, optimized and executed.

The database server 120 may include a predetermined type of computer system or computer device such as a microprocessor, a mainframe computer, a digital processor, a portable device, and a device controller. The database server 120 may include a database management system (DBMS) 130 and a persistent storage 140. In FIG. 1, one database server and one user terminal are exemplarily illustrated, but it will be apparent to those skilled in the art that database servers (management apparatuses) and user terminals there than may also be included in the scope of the present disclosure.

Although not illustrated in FIG. 1, the database server 120 may include one or more memories including a buffer cache. Further, although not illustrated in FIG. 1, the database server 120 may include one or more processors. Therefore, the DBMS 130 may be operated by the processor on the memory.

Herein, the memory as a primary storage device directly accessed by the processor, such as a random access memory (RAM) including a dynamic random access memory (DRAM), a static random access memory (SRAM), etc., may mean a volatile storage device in which stored information is momentarily erased when power is turned off, but is not limited thereto. The memory may be operated by control by the processor. The memory may temporarily store a data table including a data value. The data table may include the data value and in the exemplary embodiment of the present disclosure, the data value of the data table may be written in the persistent storage 140 from the memory. In an additional aspect, the memory may include the buffer cache and data may be stored in a data block of the buffer cache. The data may be written in the persistent storage 140 by a background process.

The persistent storage 140 means a non-volatile storage medium which may consistently store predetermined data, such as a magnetic disk, an optical disk, and a magneto-optical storage device and a storage device based on a flash memory and/or a battery-backup memory. The persistent storage 140 may communicate with the processor and the memory of the database server 120 through various communication means. In an additional exemplary embodiment, the persistent storage 140 is positioned outside the database server 120 to communicate with the database server 120. Further, in FIG. 1, only one persistent storage and one DBMS are illustrated, but a type in which a plurality of DBMSs is connected to one persistent storage or a type including the plurality of persistent storages may also be included in the scope of the present invention.

The DBMS 130 as a program for permitting the database server 120 to perform operations including retrieval, insertion, modification, and/or deletion of required data may be implemented by the processor in the memory of the database server 120 as described above.

The user terminal 110 and the database server 120 or the database management apparatuses may also communicate with each other through the network (not illustrated). The network according to the exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network presented in the present specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems. Additionally, the network may include a database link (dblink), and as a result, a plurality of database servers communicates with each other through the database link to fetch data from another database management apparatus. The techniques described in the present specification may be used in other networks in addition to the aforementioned networks.

Figure 2:
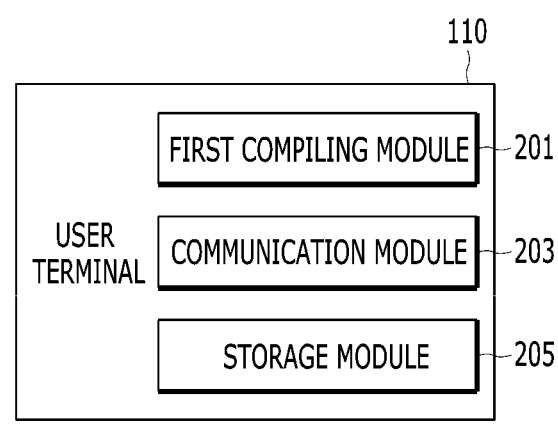
FIG. 2 is an exemplary block diagram of the user terminal according to the exemplary embodiment of the present disclosure.

FIG. 2 is an exemplary block diagram of the user terminal according to the exemplary embodiment of the present disclosure. As illustrated in FIG. 2, the user terminal 110 may include a first compiling module 201, a communication module 203, and a storage module 205. The modules illustrated in FIG. 2 are exemplary and some of the modules may be omitted or additional modules may be included in the user terminal 110. In an additional exemplary embodiment of the present disclosure, the first compiling module 201 of the user terminal 110 may be incorporated into the database server 120.

In the exemplary embodiment of the present disclosure, the first compiling module 201 may be referred to as an application compiler. The first compiling module 201 may check Syntax for the query, create Parse Tree, create abstract Syntax Tree, and verify semantic in response to reception of the query issued from the client. Herein, the query may include predetermined language expressions related to SQL used in application programs using languages including ESQL, PL/SQL, etc., or application programs using C, C++, Java DB Client Library, etc. The query may include the bind parameters (alternatively, bind variables) or may be related with the bind parameters (alternatively, bind variables).

The first compiling module 201 may refer to a compiler that performs optimization which is irrespective of the SQL. The first compiling module 201 may perform at least one of data flow analysis and inter procedural analysis for the received query. The first compiling module 201 may acquire range information for the bind parameter through the aforementioned analysis. The acquired information on the bind parameter may be expressed as a static value.

The first compiling module 201 creates the acquired range information for the bind parameter in a hint type to reflect the created range information to the received query. Therefore, the first compiling module 201 reflects the hint information to the received query to rewrite the received query.

The first compiling module 201 converts the rewritten query into a type which may be ready by an SQL component to create an execution code.

In the exemplary embodiment of the present disclosure, the operations performed by the first compiling module 201 may be performed in a compiling stage in the present system. Further, the operations performed by the second compiling module 301 may be performed in a runtime stage in the present system. For example, when the first compiling module 201 is included in the user terminal 110, the compiling stage may be generated at the user terminal 110 side. Further, when the first compiling module 201 is included in the database server 120, the compiling stage may be generated at the database server 120 side.

The communication module 203 may receive or be input with a predetermine query issued by the user. The query means a predetermined request or command for requesting processing in the database server and may include, for example, data manipulation language (DML), data definition language (DDL), PL/SQL, and/or ESQL. The query may include the bind parameter or be related with the bind parameter.

The communication module 203 may provide a communication function with the database server 120 or another user terminal. For example, the communication module 203 may transmit a compiling result related to the received query to the database server 120. Further, the communication module 203 may communicate with the database server 120 or another user terminal by using the aforementioned predetermined network and/or database link. In the exemplary embodiment of the present disclosure, the communication module 203 may transfer the query compiled and rewritten by the first compiling module 201 or the execution code related to the rewritten query to the second compiling module 301 or the database server 120. In an additional aspect of the present disclosure, the communication module 203 may transfer both the rewritten query (machine code) processed by the first compiling module 201 and the source code input/received from the user to the database server 120 or the second compiling module 301.

The storage module 205 may temporarily or permanently store predetermined data stored in relation with execution of a task by the user terminal 110. The storage module 205 may manage or store a predetermined query or request related with processing of data. For example, the storage module 205 may store the application source created and input (alternatively, received) by the developer. For example, the storage module 205 may store the client application.

As another example, the storage module 205 may determine to store the data and an index table. Further, the storage module 205 may determine storage locations for the data and/or the index table. For example, the storage module 205 may determine the storage location of the data in a data table. As another example, the storage module 205 may determine the storage location of the data in the persistent storage. The storage module 205 may temporarily or permanently store predetermined data processed and stored by the user terminal 110.

Figure 3:
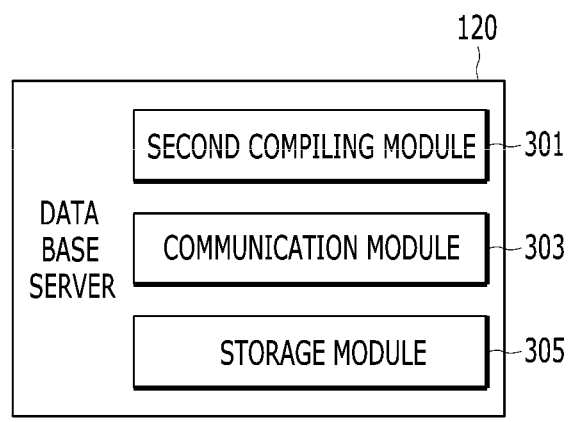
FIG. 3 is an exemplary block diagram of the database server according to the exemplary embodiment of the present disclosure.

FIG. 3 is an exemplary block diagram of the database server according to the exemplary embodiment of the present disclosure.

As illustrated in FIG. 3, the database server 120 may include a second compiling module 301, a communication module 303, and a storage module 305. The modules illustrated in FIG. 3 are exemplary and some of the modules may be omitted or additional modules may be included in the database server 120.

In an additional exemplary embodiment of the present disclosure, the first compiling module 201 of the user terminal 110 may be incorporated into the database server 120. In this case, a first compiling operation (compiling stage) and a second compiling operation (runtime stage) may be performed in the database server 120.

According to the exemplary embodiment of the present disclosure, the second compiling module 301 may be referred to as an SQL compiler. The second compiling module 301 may determine the optimized execution plan with respect to the received query based on the hint information of the rewritten and converted query received according to the compiling operation, the query rewriting operation, and the execution code creation operation performed by the first compiling module 201.

The second compiling module 301 analyzes the hint information reflected into the rewritten query to obtain value information regarding the bind parameter included in the received query. The second compiling module 301 may determine the optimized execution plan for the received query based on the acquired value information for the bind parameter.

The second compiling module 301 may create a logical plan for the rewritten query based on at least one of predetermined rule information and cost information required for performing the plan and determine an optimized physical plan corresponding to the created logical plan as the optimized execution plan based on the hint information reflected into the rewritten query.

The second compiling module 301 may verify Syntax and Semantic for the input/received query, analyze an identifier, and perform a View inline operation.

The optimization operation performed by the second compiling module 301 may be referred to as Expression optimization and more delicate Cardinality may be analyzed through the optimization operation and the optimized physical plan is created to optimize the query executed in the runtime.

The operations performed by the second compiling module 301 may be performed in the runtime stage in the database server 120.

The communication module 303 may provide the communication function with the user terminal 110 or another database server. For example, the communication module 303 may transmit a second compiling result related to the received query to the user terminal 110. Further, the communication module 303 may communicate with the user terminal 110 or another database server by using the aforementioned predetermined network and/or database link. In the exemplary embodiment of the present disclosure, the communication module 303 may transfer to the user terminal 110 the processing result of the query performed with respect to the optimized physical plan compiled and created by the second compiling module 301.

The storage module 305 may store predetermined data stored in relation with execution of the task by the database server 120. The storage module 305 may manage or store a predetermined request related with processing of the data. For example, the storage module 305 may determine to store the data and the index table. Further, the storage module 305 may determine the storage locations for the data and/or the index table. For example, the storage module 305 may determine the storage location of the data in the data table. As another example, the storage module 305 may determine the storage location of the data in the persistent storage. The storage module 305 may temporarily or permanently store predetermined data processed and stored by the database server 120. The storage module 305 may store information on the execution plan created according to the second compiling result as metadata. Further, the storage module 305 may store a query processing result executed with respect to the execution plane according to the second compiling result.

In another exemplary embodiment of the present disclosure, the storage module 305 may store information on the bind parameter created according to the first compiling result and/or information on the rewritten query. In this case, the second compiling module retrieves the corresponding information stored in the storage module to determine the optimized execution plan.

Figure 4:
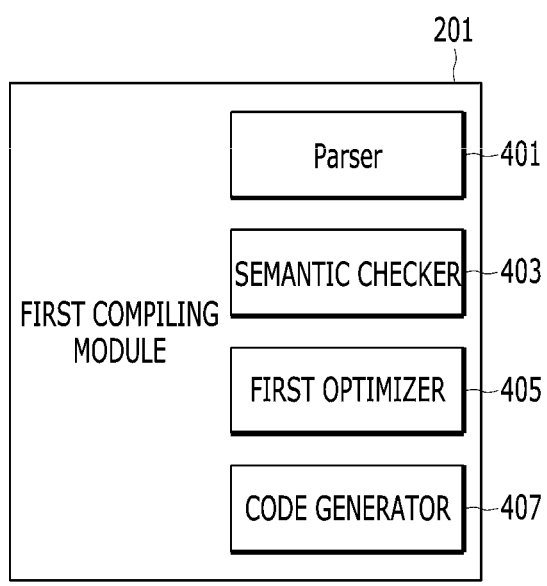
FIG. 4 is an exemplary block diagram of a first compiling module of the user terminal (alternatively, database) according to the exemplary embodiment of the present disclosure.

FIG. 4 is an exemplary block diagram of a first compiling module of the user terminal (alternatively, database server) according to the exemplary embodiment of the present disclosure.

As illustrated in FIG. 4, the first compiling module 201 may include a parser 401, a semantic checker 403, a first optimizer 405, and a code creator 407. Components of the first compiling module 201 illustrated in FIG. 4 are exemplary and some of the components may be omitted or additional components may exist.

The parser 401 may check Syntax for the received query and create Parse Tree. The semantic checker 403 may create Abstract Syntax tree and verify Semantic.

The first optimizer 405 may perform compiling optimization which is irrespective of the SQL. The first optimizer 405 performs at least one of the data flow analysis and the inter procedural analysis for the received query to obtain the range information for the bind parameter. The first optimizer 405 may obtain static value information for the bind parameter included in the query through the analyses.

The data flow analysis as a technique that expresses and analyzes a pattern for a definition and a flow of data expressed in a native code as a data flow diagram may determine a constraint condition to be applied to data at a specific location while the native code is compiled.

The inter procedural analysis may be referred to as inter procedural optimization and this means a collection of compiler techniques used in computer programming and is a static analysis technique for increasing performance in a program including repeated and used functions. All routes in the function and the code are analyzed through the analysis to find a system failure, a performance related error, an error caused due to a mutual call relationship of files, and the like.

The first optimizer 405 may reflect the obtained information regarding the bind parameter into the received query as the hint type. The first optimizer 405 may add the information regarding the bind parameter to the received query. Through such an operation, the first optimizer 405 may rewrite the received query.

The first optimizer 405 may perform a function of native compiling. For example, the first optimizer 405 may create the execution code (e.g., machine code) which may be recognized by the database server 120 through the native compiling for a PL/SQL source code input from the user. In this case, declaration or exception processing of conditional statements, loop statements, and variables which are difficult to process only by an SQL query may be processed through a native compiling process. For example, an ESQL source code input from the user may be compiled through pre compiling or C compiling by the first optimizer 405.

The code creator 407 may convert the query rewritten by the first optimizer 405 into the execution code of a type which may be recognized by a second optimizer 505 (that is, database server 120).

Figure 5:
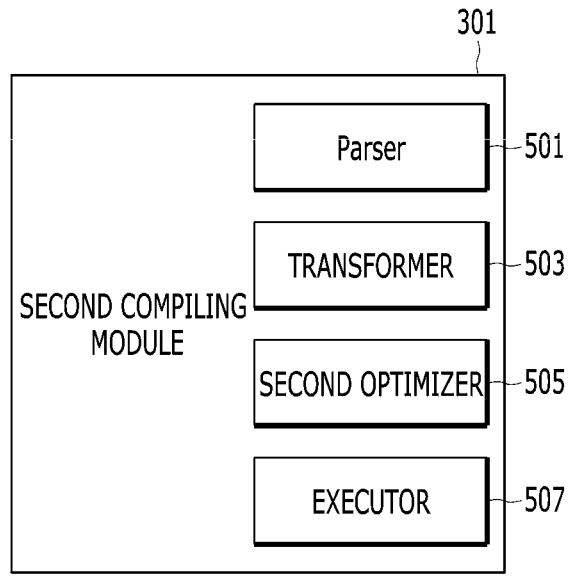
FIG. 5 is an exemplary block diagram of a second compiling module according to the exemplary embodiment of the present disclosure.

FIG. 5 is an exemplary block diagram of a second compiling module according to the exemplary embodiment of the present disclosure.

As illustrated in FIG. 5, the second compiling module 301 may include a parser 501, a converter 503, the second optimizer 505, and an executor 507. The components of the second compiling module 301 illustrated in FIG. 5 are exemplary and some of the components may be omitted or additional components may exist.

The parser 501 may verify Syntax and Semantic information for the received query. For example, in relation with verification of Syntax, Inline view, Subquery, Outer Join, Connect By, Updatable Join View, Partitioned Table, Cube/Rollup, Analytic Functions, Merge Into, Hint, Materialized View, and the like may be checked.

In relation with verification of the Semantic information, the parser 501 may identify database objects and verify a privilege. The parser 501 may also create a logical execution plan for the received query. The logical execution plan may be created in a tree structure. Further, the parser 501 may verify identifiers for the database objects and perform the View inline operations, and the like.

The converter 503 may convert the logical execution plan created by the parser 501 into a better or another logical plan. The processing result for the converted logical plan is the same as the processing result depending on the logical plan created by the parser 501. That is, the converter 503 may create a logical plan of a type in which an execution time may become short or create a plan in which the optimizer 505 may consider more physical execution plans. Further, the converter 503 may create the logical plan for the rewritten query based on at least one of the predetermined rule information and the cost information required for executing the plan.

For example, features which may be processed by the converter 503 may include Join Elimination, Outer-join Simplification, View Merging, Subquery Unnesting, Subquery Elimination, Aggregation subquery Elimination, Orderby Elimination, and/or Subquery Coalescing.

The optimizer 505 may create a physical execution plan of which the execution time is anticipated to be shortest from the logical execution plan created by the converter 503. For example, the optimizer 505 may determine operations which need to be actually executed by the executor 507 with respect to nodes of respective logical execution plans and determine an execution order of the operations. The optimizer 505 may perform cost-based optimization and herein, the cost may include processing cost of I/O and a CPU (alternatively, GPU).

In the exemplary embodiment of the present disclosure the optimizer 505 may create an optimal physical execution plan based on the information on the bind parameter received as the hint. The optimizer 505 may obtain the value information (alternatively, range information) for the bind parameter included in the received query based on the hint information reflected into the rewritten query and determine the optimized physical execution plan for the received query based on the value information (alternatively, range information) for the obtained bind parameter.

The executor 507 may actually execute the specified operations according to the physical execution plan created by the optimizer 505. Executed result data may be finally transferred to the user terminal 110 or user side.

Figure 6:
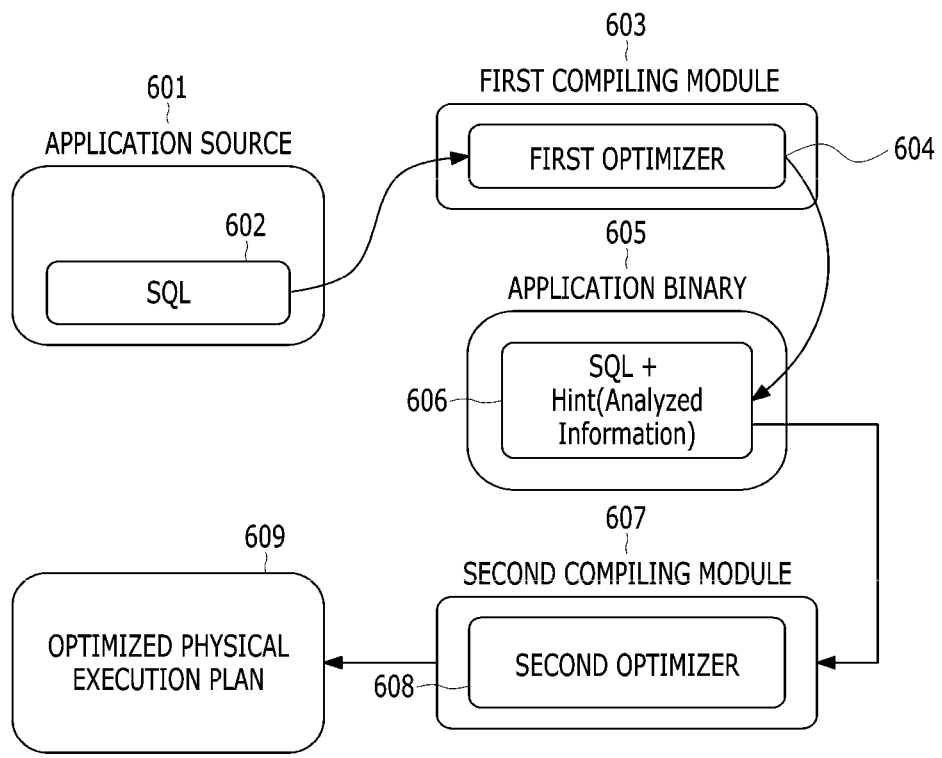
FIG. 6 illustrates a schematic expression for an optimization technique for a database application according to the exemplary embodiment of the present disclosure.

FIG. 6 illustrates a schematic expression for an optimization technique for a database application according to the exemplary embodiment of the present disclosure.

The drawing illustrated in FIG. 6 is just exemplary and some steps may be omitted or additional steps may exist.

As illustrated in FIG. 6, a query issued from an application source 601 may include an SQL 602. Herein, the application source 601 may refer to the client, the user, etc., or mean the application program, a computer device, the user terminal, etc., which are operated by the client, the user, etc.

The query issued from the application source 601 may be converted into an application binary 605 through a first optimizer 604 of a first compiling module 603.

The application binary 605 may include a language of a type which may be processed by a second compiling module 607. The application binary 605 may include a rewritten SQL 606 in which the hint information is reflected to the SQL issued from the application source 601.

A second optimizer 608 of the second compiling module 607 may create an optimized physical execution plan 609 based on the rewritten SQL 606.

In the exemplary embodiment of the present disclosure, it is assumed that 99% of one table includes a value for a case where a gender is male and 1% includes a value for a case where the gender is female. In this case, when a bind peeking technique which is a technique in the related art is used, all execution plans may be fixedly determined as a value of a bind parameter which is first input. Under the assumption, in a case where the value of the bind parameter indicates that the gender is female, index scanning may be performed and in a case where the value of the bind parameter indicates that the gender is male, full scan may be performed. In a scheme according to the exemplary embodiment of the present disclosure, since the value (e.g., gender information) of the bind parameter is pre-analyzed in the compiling stage and thereafter, transferred to the second compiling module of the database server in the hint type, the second compiling module of the database server may create the execution plan for the index scan when the gender information expressed by the bind parameter is female and create the execution plan for the full scan when the gender information is male according to the hint information. Therefore, a more efficient and accurate execution plan may be created.

In the exemplary embodiment of the present disclosure, since the information of the bind parameter is created as an SQL hint through a first compiling process, accurate selectivity for the query including the bind parameter may be calculated. As compared with the case of using the adaptive cursor sharing technique which is the technique in the related art, the exemplary embodiment of the present disclosure has an advantage in that overhead caused by finding a separate sub plan does not occur.

In the exemplary embodiment of the present disclosure, it is assumed that the query issued from the application source includes the following contents:

Select decode (:B1<10, :B1*10, :B1*20) from tbl1;

The adaptive cursor sharing technique which is the technique in the related art may not be applied to the query. However, the query received through the first compiling module may be rewritten as below through the technique according to the present disclosure:

Select :B1*10 FROM TBL1;
Select :B1*20 FROM TBL1;

Therefore, according to the exemplary embodiment of the present disclosure, there is an advantage in that the value information of the bind parameter is obtained as the hint information to achieve accuracy of Cardinality prediction and the runtime overhead is reduced as compared with other techniques in the related art, and as a result, the performance of the database is increased. The technique according to the present disclosure may be applied to a case of optimizing the application program with embedded SQL languages including ESQL, PL/SQL, and the like and a case of optimizing the application program using C, C++, Java DB client library, and the like.

Figure 7:
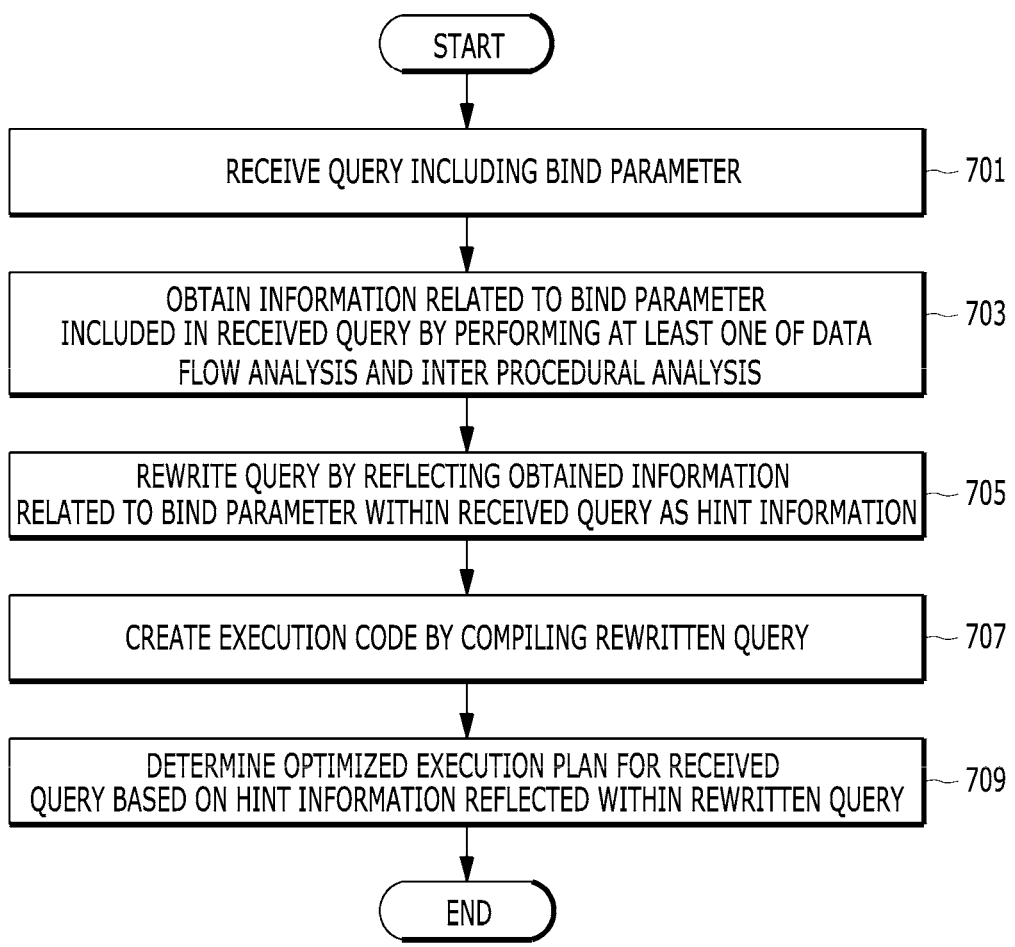
FIG. 7 illustrates an exemplary flowchart of the optimization technique for the database application according to the exemplary embodiment of the present disclosure.

FIG. 7 illustrates an exemplary flowchart of the optimization technique for the database application according to the exemplary embodiment of the present disclosure.

The drawing illustrated in FIG. 7 is just exemplary and some steps may be omitted or additional steps may exist.

As illustrated in FIG. 7, the user terminal 110 may be input with/receive the query including the bind parameter from the user (701). Then, the user terminal 110 performs at least one analysis of the data flow analysis and the inter procedural analysis to obtain the information on the bind parameter included in the received query in the compiling stage (703).

The user terminal 110 reflects the obtained information on the bind parameter into the received query as the hint information to rewrite the query (705). The user terminal 110 natively compiles the rewritten query to transform the natively compiled query into the execution code which may be executed by the database server (e.g., second compiling module) (707).

The database server 120 may determine the optimized execution plan for the received query based on the hint information reflected into the rewritten query (709).

As described above, it is described that steps 701 to 707 in FIG. 7 are performed by the user terminal 110, but the corresponding steps are incorporated into the database server 120 to be performed by the database server 120.

Figure 8:
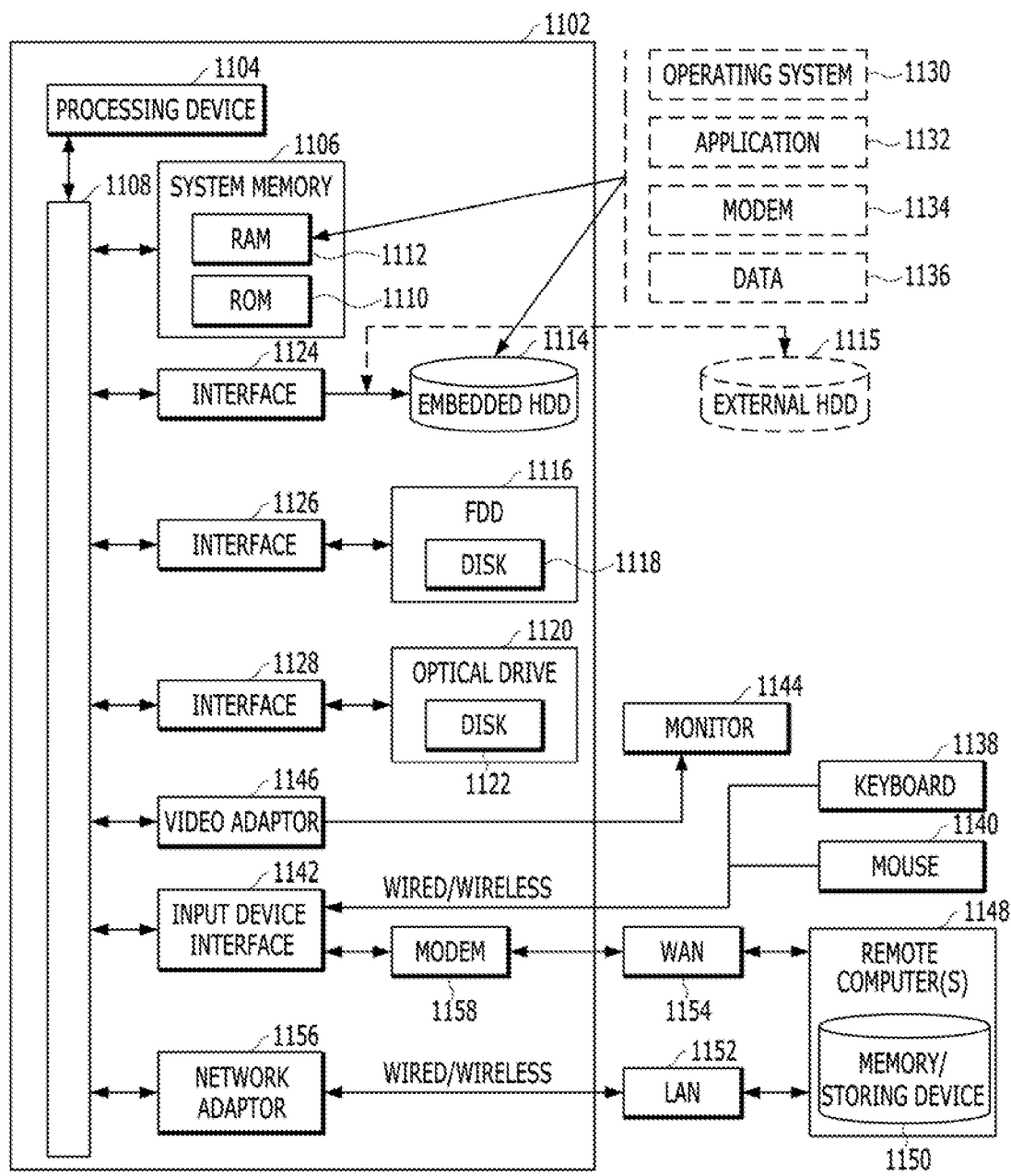
FIG. 8 illustrates a simple and general schematic view of an exemplary computing environment in which the exemplary embodiments of the present disclosure may be implemented.

FIG. 8 illustrates a simple and general schematic view of an exemplary computing environment in which the exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or as a combination of hardware and software.

In general, the module in the present specification includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media.

The computer readable storage media include volatile and non-volatile media, temporary or non-temporary media, movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As an example rather than a limit, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive (HDD) 1114 may also be configured for an external purpose in an appropriate chassis (not illustrated)—, a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an external drive includes, for example, at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. The devices and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and the like and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication in the LAN 1152 and the LAN 1152 also includes a wireless access point installed therein in order to communicate with the wireless adapter 1156. When the computer 1102 is used in the WAN networking environment, the computer 1102 may include a modem 1158 or is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that illustrated network connection is exemplary and it will be well appreciated that other means configuring a communication link among computers may be used.

The computer 1102 performs an operation of communicating with predetermined wireless devices or entities which are disposed and operated by the wireless communication, for example, the printer, a scanner, a desktop and/or portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology for such a device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps(802.11a) or 54 Mbps (802.11b) in unlicensed 2.4 and 5 GHz wireless bands or operate in a product including both bands (dual bands).

Those skilled in the art of the present disclosure will appreciate that various exemplary logic blocks, modules, processors, means, circuits, and algorithm steps described in association with the embodiments disclosed herein can be implemented by electronic hardware, various types of programs or design codes (designated as "software" herein for easy description), or a combination thereof. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. The term "machine-readable media" include a wireless channel and various other media that can store, posses, and/or transfer command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is coherent with the principles and new features presented herein.

What is claimed is:

1. An optimized execution plan generator, comprising at least one non-transitory computer-readable storage medium programmed to cause at least one processor to instantiate:
    a first compiler programmed to:
        (a) receive a received query comprising a bind parameter,
        (b) obtain information related to the bind parameter by performing at least one of a data flow analysis and an interprocedural analysis for the received query to obtain range information for the bind parameter as a hint information,
        (c) rewrite the received query by reflecting the obtained information as hint information, and
        (d) convert the rewritten query into a type that is readable by an SOL component, wherein the SOL component creates an execution code from the rewritten query; and
    a second compiler programmed to:
        (a) receive a rewritten query from the first compiler comprising the reflected obtained information containing the obtained range information for the bind parameter as the hint information,
        (b) analyze the hint information reflected into the rewritten query to obtain value information related to the bind parameter,
        (c) generate the optimized execution plan based on the hint information comprising obtained value information related to the bind parameter, and
        (d) execute the optimized execution plan.

2. The optimized execution plan generator of claim 1, wherein the first compiler is programmed to obtain information related to the bind parameter and rewrite the query before a runtime stage of a database server that executes at least a portion of the optimized execution plan.

3. The optimized execution plan generator of claim 1, wherein the first compiler is further programmed to verify whether a semantic for the received query is abnormal by checking syntax for the received query, creating a parse tree, and creating an abstract syntax tree after receiving the query.

4. The optimized execution plan generator of claim 1, wherein the second compiler is programmed to generate the optimized execution plan by transforming the rewritten query into a type enabled to be read and executed by a database management system (DBMS).

5. The optimized execution plan of claim 1, wherein the second compiler is programmed to generate the optimized execution plan by:
    creating an optimized logical plan for the rewritten query based on at least one of a predetermined rule information and a cost information required for executing the optimized execution plan; and
    creating an optimized physical plan corresponding to the created logical plan based on the hint information.

6. The optimized execution plan of claim 5, wherein the second compiler is programmed to create the logical plan in a tree structure comprising at least one of a join elimination, outer-join simplification, view merge action, subquery unnesting action, subquery elimination, aggregation subquery elimination, order by elimination, and/or subquery coalescing action.

7. The optimized execution plan of claim 5, wherein the second compiler is programmed to select at least one of two potential optimized physical plans based on value information for the obtained bind parameter.

8. The optimized execution plan of claim 5, wherein the rewritten query is created during a compiling stage of a user terminal and the operation for creating the optimized physical plan is performed in a runtime stage of a database server.

9. A database server for implementing an optimization operation for a database application, the server comprising:
    a communication module receiving a query including a bind parameter;
    a processor including one or more cores;
    wherein the processor includes:
        a first compiling module, wherein the first compiling module:
            obtains information related to the bind parameter by performing at least one of a data flow analysis and an interprocedural analysis for the received query to obtain range information for the bind parameter as the obtained hint information,
            reflects the obtained information related to the bind parameter within the received query as hint information to rewrite the received query, and
            converts the rewritten query into a type that is readable by an SQL component, wherein the SQL component creates an execution code from the rewritten query; and
        a second compiling module receiving a rewritten query from the first compiling module comprising the reflected obtained information containing the obtained range information for the bind parameter as the hint information,
            analyzing the hint information reflected into the rewritten query to obtain value information related to the bind parameter,
            generating the optimized execution plan based on the hint information comprising obtained value information related to the bind parameter and executing the optimized execution plan.

10. The database server of claim 9, wherein the communication module additionally transfers the created execution code to a second compiling module.

11. The database server of claim 9, further comprising:

the second compiling module, wherein the second compiling module includes a second optimizer determining an optimized execution plan for the received query based on the hint information reflected within the rewritten query.

12. The database server of claim 11, wherein the second optimizer additionally obtains value information related to the bind parameter included in the received query based on the hint information reflected within the rewritten query, and determines the optimized execution plan with respect to the received query based on the obtained value information related to the bind parameter.

13. The database server of claim 11, wherein the second compiling module includes a transformer creating a logical plan for the rewritten query based on at least one of predetermined rule information and cost information required for executing the plan, and the second optimizer determines an optimized physical plan corresponding to the created logical plan as the optimized execution plan based on the hint information reflected within the rewritten query.

14. The database server of claim 9, wherein the first compiling module includes a first optimizer performing at least one of a data flow analysis and an inter procedural analysis for the received query to obtain range information for the bind parameter.

15. The database server of claim 9, wherein operations of the first compiling module are performed before a runtime of the database server.

16. A user terminal for implementing an optimization operation for a database application, the user terminal comprising:

a processor including one or more cores;

wherein the processor includes:

a first compiling module configured to;

receive a query including a bind parameter, obtain information related to the bind parameter by performing at least one of a data flow analysis and an interprocedural analysis for the received query to obtain range information for the bind parameter as the obtained hint information, reflect the obtained information related to the bind parameter within the query as hint information to rewrite the query, and convert the rewritten query into a type that is readable by an SQL component, wherein the SQL component creates an execution code from the rewritten query; and a communication module transferring the rewritten query to the database server so that the second compiler of the database server generates the rewritten query as an execution plan, wherein the execution plan is generated by the second compiler through the following steps:

receiving a rewritten query from the first compiling module comprising the reflected obtained information containing the obtained range information for the bind parameter as the hint information, analyzing the hint information reflected into the rewritten query to obtain value information related to the bind parameter, generating the optimized execution plan based on the hint information comprising obtained value information related to the bind parameter.

17. The user terminal of claim 16, wherein the first compiling module performs at least one of a data flow analysis and an inter procedural analysis for the received query to obtain range information for the bind parameter.

* * * * *

UNITED STATES PATENT AND TRADEMARK OFFICE
CERTIFICATE OF CORRECTION

| | | |
|---|---|---|
| PATENT NO. | : 10,949,424 B2 | Page 1 of 1 |
| APPLICATION NO. | : 15/654041 | |
| DATED | : March 16, 2021 | |
| INVENTOR(S) | : Sang Young Park et al. | |

It is certified that error appears in the above-identified patent and that said Letters Patent is hereby corrected as shown below:

In the Claims

At Column 17 Line 48, in Claim 1, change, "readable by an SOL component, wherein the SOL" to --readable by an SQL component, wherein the SQL--

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*